(12) United States Patent
Anderson (10) Patent No.: US 8,157,217 B1
(45) Date of Patent: Apr. 17, 2012

(54) SPACECRAFT RADIATOR SYSTEMS

(76) Inventor: Grant A. Anderson, Tucson, AZ (US)

( * ) Notice: Subject to any disclaimer, the term of this patent is extended or adjusted under 35 U.S.C. 154(b) by 477 days.

(21) Appl. No.: 12/428,421

(22) Filed: Apr. 22, 2009

Related U.S. Application Data (63) Continuation-in-part of application No. 12/099,086, filed on Apr. 7, 2008.

(60) Provisional application No. 60/910,633, filed on Apr. 6, 2007, provisional application No. 61/081,017, filed on Jul. 15, 2008, provisional application No. 61/125,303, filed on Apr. 23, 2008.

(51) Int. Cl.
*B64G 1/44* (2006.01)

(52) U.S. Cl. .................................................. 244/171.8

(58) Field of Classification Search ............... 244/158.1, 244/171.7, 171.8
See application file for complete search history.

(56) References Cited

U.S. PATENT DOCUMENTS

| | | |
|---|---|---|
| 5,407,727 A | 4/1995 | Newell |
| 5,961,076 A | 10/1999 | Eller et al. |
| 5,979,833 A | 11/1999 | Eller et al. |
| 6,102,112 A | 8/2000 | Herzl |
| 6,176,453 B1 | 1/2001 | Long et al. |
| 6,713,675 B2 | 3/2004 | Lukas |
| 6,883,588 B1 | 4/2005 | Low et al. |
| 7,270,302 B1 | 9/2007 | Wong et al. |

*Primary Examiner* — Richard Price, Jr.
(74) *Attorney, Agent, or Firm* — Stoneman Law Patent Group; Martin L. Stoneman; Eric Fish (57) ABSTRACT

A spacecraft radiator system designed to provide structural support to the spacecraft. Structural support is provided by the geometric "crescent" form of the panels of the spacecraft radiator. This integration of radiator and structural support provides spacecraft with a semi-monocoque design.

34 Claims, 10 Drawing Sheets

SPACECRAFT RADIATOR SYSTEMS

CROSS REFERENCE TO RELATED APPLICATION

The present application is a continuation-in-part of, and is related to and claims priority from, application Ser. No. 12/099,086, filed Apr. 7, 2008, entitled "SPACECRAFT RADIATOR SYSTEMS", which claims priority from and is related to prior provisional patent application 60/910,633, filed Apr. 6, 2007, entitled "A FAMILY OF STRUCTURAL GEOMETRY FOR SPACECRAFT RADIATORS THAT ALLOWS FOR EFFICIENT STRUCTURAL AND THERMAL PERFORMANCE"; and is related to and claims priority from prior provisional patent application Ser. No. 61/081, 017, filed Jul. 15, 2008, entitled "SPACECRAFT RADIATOR SYSTEMS"; and is related to and claims priority from prior provisional patent application Ser. No. 61/125, 303, filed Apr. 23, 2008, entitled "SPACECRAFT RADIATOR SYSTEMS", the contents of all of which are incorporated herein by this reference and are not admitted to be prior art with respect to the present invention by the mention in this cross-reference section.

STATEMENT REGARDING FEDERALLY SPONSORED RESEARCH OR DEVELOPMENT

Some embodiments of this invention were developed with United States Government support under the National Aeronautics and Space Administration (NASA) Small Business Innovation Research Contract No. NNJ05JD49C awarded by the U.S. Small Business Administration (SBA). The Government may have certain rights in the invention.

BACKGROUND

This invention relates to providing spacecraft radiator systems. More particularly, this invention relates to providing a structurally integrated spacecraft radiator system for improved spacecraft weight optimization. Even more particularly, this invention relates to providing a system for combining a radiator system with structural support to be used in a spacecraft.

In spacecraft design many compromises are involved as each system, subsystem, or component not only satisfies a function but also requires accommodation in the overall design. Due to this interaction of different subsystems with different functions, systems integration is the key to optimized spacecraft system engineering. Practically speaking, the need to break up the development, manufacture, and integration of spacecraft systems and its subsystems into manageable portions results in a hardware work breakdown structure (WBS). As designers strive to optimize their assigned WBS portion for mass, power, and volume, the result is very often an assembly of optimized subsystems into a less-than-optimized overall spacecraft. This phenomenon is referred to as "optimization by WBS". While use of WBS in spacecraft design has brought the spacecraft industry many well-functioning designs, new additional demands for optimization at the total spacecraft level now require detailed integration of spacecraft vehicle functions and proper modeling of the spacecraft at the total spacecraft level.

Spacecraft designs may use separate systems to fulfill the requirements of structural support and heat rejection. Structural support systems may be internal-frame structures while external panels of the outer skin may be used in heat radiation systems for thermal emitting of heat. Both systems may be optimized independently with no consideration of using the external panels to assist in the spacecraft structural support.

Thus, a system is needed to integrate spacecraft structural support together with the outer skin into an optimized dual purpose system, the optimization of which balances providing structural support with the thermal efficiency requirements in a spacecraft.

OBJECTS AND FEATURES OF THE INVENTION

A primary object and feature of the present invention is to provide a system overcoming the above-mentioned problems.

It is a further object and feature of the present invention to provide such a system that responds to the need to integrate the structural requirements of the spacecraft with thermal heat emitting requirements by designing a structure that is both structurally efficient and thermally efficient.

It is yet a further object and feature of the present invention to provide such a system that accomplishes efficient structural design through the use of curved "crescent" sections meant to efficiently carry primary loads through the outer skin while also providing thermal surface area for heat emitting.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a radiator system comprising: at least one thermal energy radiator structured and arranged to radiate thermal energy generated by components of at least one spacecraft; wherein such at least one thermal energy radiator receives thermal energy through at least one thermal energy transport system when such at least one thermal energy radiator is installed on such at least one spacecraft; and wherein such thermal energy transport system comprises at least one fluid filled closed loop; and at least one spacecraft structural support structured and arranged to structurally support such at least one spacecraft; wherein such at least one thermal energy radiator comprises at least one portion of such at least one spacecraft structural support; and wherein at least one geometry of such at least one thermal energy radiator substantially augments structural strength of such at least one spacecraft structural support.

Moreover, it provides such a radiator system wherein such at least one thermal energy radiator further comprises: at least one tube structured and arranged to carry at least one thermal fluid; wherein such at least one tube comprises at least one portion of such thermal energy transport system when such at least one thermal energy radiator is installed on such at least one spacecraft; wherein such at least one fluid circulates between such components of such at least one spacecraft and such at least one thermal energy radiator, when such at least one thermal energy radiator is installed on such at least one spacecraft; and wherein at least one portion of such at least one tube is thermally coupled with such at least one thermal energy radiator.

Additionally, it provides such a radiator system wherein such at least one tube comprises aluminum. Also, it provides such a radiator system wherein such at least one tube comprises at least one outer diameter of about 3/16 inch. In addition, it provides such a radiator system wherein such at least one tube comprises at least one inner diameter of about ⅛ inch.

And, it provides such a radiator system wherein thermal coupling of such at least one portion of such at least one tube to such at least one thermal energy radiator comprises at least one thermally conductive epoxy. Further, it provides such a radiator system wherein such at least one thermally conductive epoxy comprises aluminum. Even further, it provides such a radiator system wherein such at least one thermally conductive epoxy comprises "Durlaco 132".

Moreover, it provides such a radiator system wherein at least one thermal energy radiator comprises a plurality of such at least one tube. Additionally, it provides such a radiator system wherein, during operation, such plurality of such at least one tube are coupled to such at least one thermal energy transport system through at least one intake manifold and at least one outlet manifold at opposing sides of such at least one thermal energy radiator. Also, it provides such a radiator system wherein such at least one intake manifold is reversed in orientation from such at least one outlet manifold.

In addition, it provides such a radiator system wherein such at least one thermal energy radiator comprises aluminum. And, it provides such a radiator system wherein such at least one thermal energy radiator comprises aluminum 6061-T6. Further, it provides such a radiator system wherein such at least one thermal energy radiator comprises at least one diameter of about 13 feet. Even further, it provides such a radiator system wherein such at least one thermal energy radiator comprises at least one thickness of about nine hundredths of an inch. Moreover, it provides such a radiator system wherein such at least one spacecraft is manned. Additionally, it provides such a radiator system wherein such at least one spacecraft is un-manned. Also, it provides such a radiator system wherein such at least one spacecraft is nuclear powered.

In accordance with another preferred embodiment hereof, this invention provides a radiator system comprising: at least one thermal energy radiator structured and arranged to radiate thermal energy generated by components of at least one spacecraft; wherein such at least one thermal energy radiator receives thermal energy through at least one thermal energy transport system when such at least one thermal energy radiator is installed on such at least one spacecraft; and at least one spacecraft structural support structured and arranged to structurally support such at least one spacecraft; wherein such at least one thermal energy radiator comprises at least one portion of such at least one spacecraft structural support; and wherein at least one geometry of such at least one thermal energy radiator substantially augments structural strength of such at least one spacecraft structural support; wherein such at least one geometry comprises at least one panel comprising substantially at least one angular surface portion, subtended by an angle theta, of a right circular cylinder having a central longitudinal axis; wherein such at least one panel comprises at least one centerline comprising the intersection of such at least one panel and a ray bisecting such angle theta; wherein at least one plurality of such at least one panels adjacently adjoin such that each such at least one centerline of each such at least one panel are concentric about at least one respective common central axis of at least one respective such at least one plurality; wherein each such at least one panel in such at least one plurality comprises at least one regular angular displacement comprising at least one angle gamma measured from such at least one respective common central axis; and wherein the difference between the value of such at least one angle theta and such at least one angle gamma is less than 180 degrees.

In addition, it provides such a radiator system wherein the difference between the value of such at least one angle theta and such at least one angle gamma is about 40 degrees. And, it provides such a radiator system wherein such at least one angle gamma is about nine degrees.

Further, it provides such a radiator system wherein the difference between the value of such at least one angle theta and such at least one angle gamma is about 120 degrees. Even further, it provides such a radiator system wherein such at least one angle gamma is about nine degrees.

Moreover, it provides such a radiator system wherein such at least one thermal energy radiator comprises aluminum. Additionally, it provides such a radiator system wherein such at least one thermal energy radiator comprises aluminum 6061-T6.

Also, it provides such a radiator system wherein such at least one thermal energy transport comprises at least one fluid filled closed loop. In addition, it provides such a radiator system wherein such at least one thermal energy radiator further comprises: at least one tube structured and arranged to carry at least one thermal fluid; wherein such at least one tube comprises at least one portion of such thermal energy transport system when such at least one thermal energy radiator is installed on such at least one spacecraft wherein such at least one fluid circulates between such components of such at least one spacecraft and such at least one thermal energy radiator, when such at least one thermal energy radiator is installed on such at least one spacecraft; and wherein at least one portion of such at least one tube is thermally coupled with such at least one thermal energy radiator.

And, it provides such a radiator system wherein such at least one tube comprises aluminum. Further, it provides such a radiator system wherein such at least one tube comprises at least one outer diameter of about 3/16 inch. Even further, it provides such a radiator system wherein such at least one tube comprises at least one inner diameter of about ⅛ inch.

Even further, it provides such a radiator system wherein thermal coupling of such at least one portion of such at least one tube to such at least one thermal energy radiator comprises at least one thermally conductive epoxy. Even further, it provides such a radiator system wherein such at least one thermally conductive epoxy comprises aluminum. Even further, it provides such a radiator system wherein such at least one thermally conductive epoxy comprises "Durlaco 132".

Even further, it provides such a radiator system wherein at least one thermal energy radiator comprises a plurality of such at least one tube. Even further, it provides such a radiator system wherein, during operation, such plurality of such at least one tube are coupled to such at least one thermal energy transport system through at least one intake manifold and at least one outlet manifold at opposing ends of such at least one thermal energy radiator. Even further, it provides such a radiator system wherein such at least one intake manifold is reversed in orientation from such at least one outlet manifold.

Even further, it provides such a radiator system wherein such at least one thermal energy radiator comprises aluminum. Even further, it provides such a radiator system wherein such at least one thermal energy radiator comprises aluminum 6061-T6. Even further, it provides such a radiator system wherein such at least one thermal energy radiator comprises at least one diameter of about 13 feet. Even further, it provides such a radiator system wherein such at least one thermal energy radiator comprises at least one thickness of about nine hundredths of an inch.

Even further, it provides such a radiator system wherein such at least one spacecraft is manned. Even further, it provides such a radiator system wherein such at least one spacecraft is un-manned. Even further, it provides such a radiator system wherein such at least one spacecraft is nuclear powered. And, it provides for each and every novel feature, element, combination, step and/or method disclosed or suggested herein.

DETAILED DESCRIPTION OF THE BEST MODES AND PREFERRED EMBODIMENTS OF THE INVENTION

Figure 1:
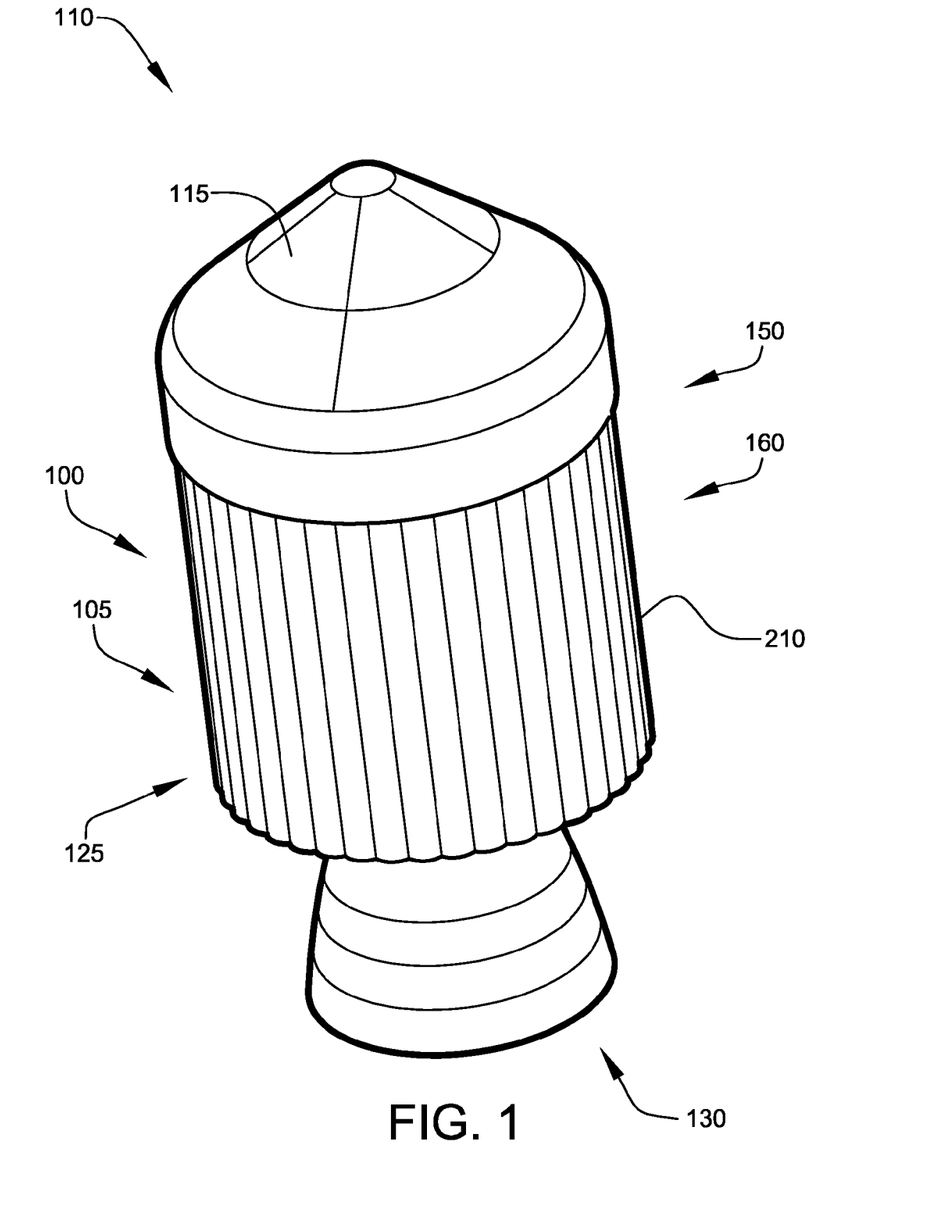
FIG. 1 shows a perspective view of a preferred spacecraft, illustrating a spacecraft heat emitting system, according to a preferred embodiment of the present invention.

FIG. 1 shows a perspective view of a preferred spacecraft 110, illustrating preferred spacecraft heat emitting system 100, according to a preferred embodiment of the present invention. Spacecraft 110 preferably comprises at least one manned spacecraft, preferably at least one Crew Exploration Vehicle 150. Crew Exploration Vehicle 150 preferably comprises at least one command module 115 and preferably at least one service module 125. Service module 125 preferably comprises at least one propulsion system 130 and preferably at least one thermal energy radiator 105 of spacecraft heat emitting system 100, as shown. Service module 125 preferably provides thrust and preferably heat emitting functionality preferably to propulsion system 130 and preferably to command module 115. Service module 125 preferably comprises at least one structural support 160 (at least embodying herein at least one spacecraft structural support). Structural support 160 of spacecraft 110 preferably comprises thermal energy radiator 105, as shown. Thermal energy radiator 105 (at least embodying herein wherein said at least one thermal energy radiator comprises at least one portion of said at least one spacecraft structural support) of spacecraft heat emitting system 100 therefore preferably provides structural load capability while also preferably providing heat emitting for spacecraft 110.

For testing purposes, applicant used an Apollo-like spacecraft design for Crew Exploration Vehicle 150. In testing conducted by applicant, thermal energy radiator 105 of spacecraft heat emitting system 100 showed about 75% in increase to load capacity over a standard skin of a standard service module for about 1.4% increase in mass; this increase in load capacity is estimated by applicant to save between about 800 lbs and about 1000 lbs in the overall mass of Crew Exploration Vehicle 150 by reducing internal structural support members needed.

Figure 2:
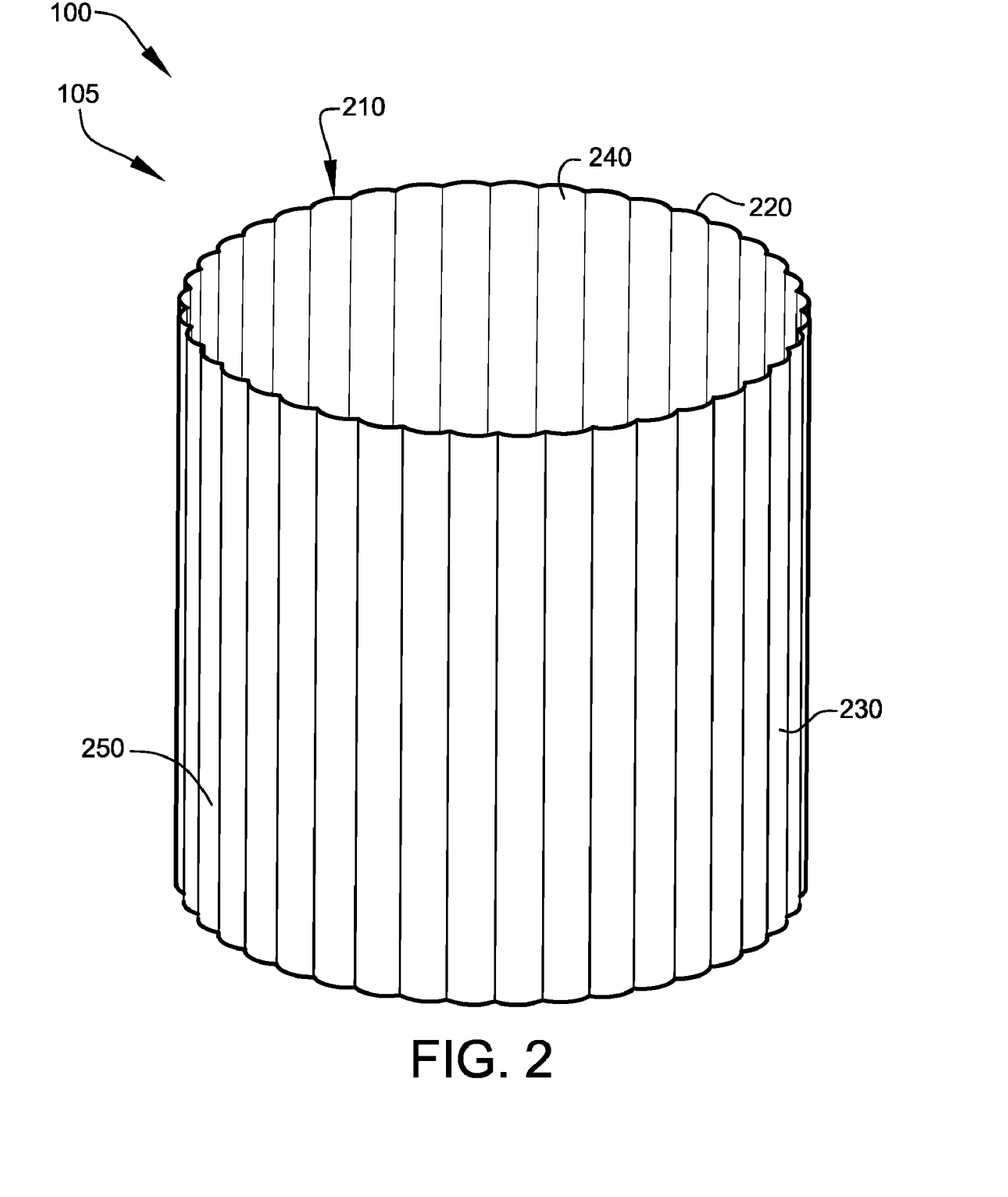
FIG. 2 shows a partial perspective view of the spacecraft heat emitting system, illustrating a preferred spacecraft radiator skin, according to the preferred embodiment of FIG. 1.

FIG. 2 shows a partial perspective view of spacecraft heat emitting system 100, illustrating at least one spacecraft radiator skin 210, according to the preferred embodiment of FIG. 1. Thermal energy radiator 105 of spacecraft heat emitting system 100 preferably comprises spacecraft radiator skin 210. In use on an Apollo-like spacecraft, spacecraft radiator skin 210 preferably circumferentially encloses service module 125 preferably having a diameter, large enough to provide adequate interior volume for components of service module 125 and preferably aligning to provide structural support to command module 115, preferably comprising a diameter of preferably about 13 feet. Upon reading this specification, those skilled in the art will now appreciate that, under appropriate circumstances, considering such issues as, spacecraft size, service module volume requirements, etc., other diameters, such as, for example, about 5 feet, about 60 feet, about 25 feet, etc. may suffice.

As best shown in FIG. 2, spacecraft radiator skin 210 preferably comprises at least one inner surface 240, and preferably at least one outer surface 230.

Outer surface 230 of spacecraft radiator skin 210 (at least embodying herein at least one thermal energy radiator structured and arranged to radiate thermal energy generated by components of at least one spacecraft) preferably is coated with at least one thermal enhancement coating 250. Thermal enhancement coating 250 preferably provides reflection of thermal energy 560 (see FIG. 5) incident upon spacecraft radiator skin 210, as well as, emission of thermal energy 560 originating within spacecraft 110, as shown. Thermal enhancement coating 250 preferably provides desired thermal properties, preferably including emissivity and absorbtivity. Thermal enhancement coating 250 preferably comprises at least one applied coating, preferably paint, preferably white paint, preferably Alion S13GP:6N/LO-1 (available from Alion Science and Technology headquartered in McLean, Va., www.alionscience.com). Upon reading this specification, those skilled in the art will now appreciate that, under appropriate circumstances, considering such issues as, cost, required thermal properties, available materials, etc., other thermal enhancement coatings, such as, for example, plastics, resins, other paints, etc., may suffice.

Figure 3A:
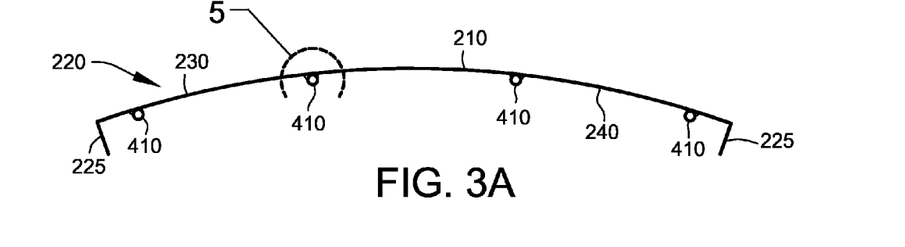
FIG. 3A shows a cross-sectional view, illustrating a preferred crescent panel, according to the preferred embodiment of FIG. 1.
Figure 3B:
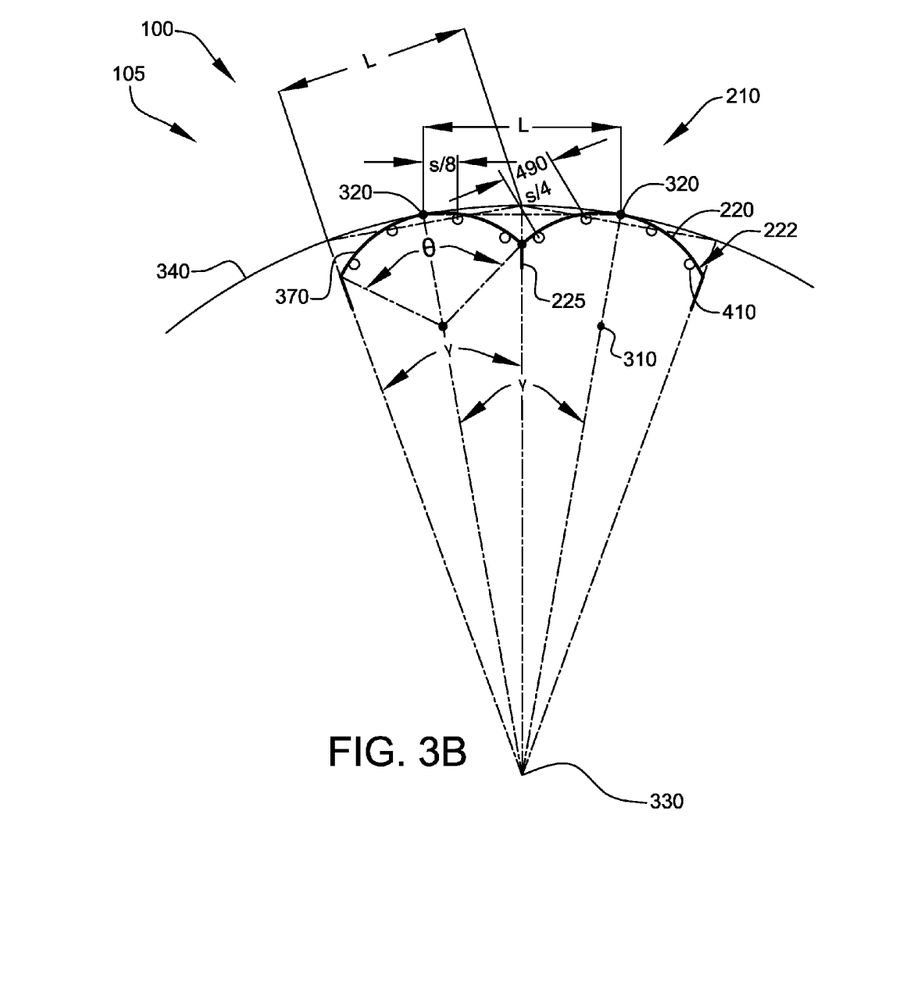
FIG. 3B shows a geometric diagram, illustrating the preferred geometric relationship of preferred spacecraft radiator skin, according to the preferred embodiment of FIG. 1.

Spacecraft radiator skin 210 preferably comprises a plurality of crescent panels 220, as shown. Thickness of spacecraft radiator skin 210 preferably is about 0.09 inch (this arrangement at least herein embodies wherein said at least one thermal energy radiator comprises a radiating-skin thickness of about nine hundredths of an inch). Crescent panel 220 preferably comprises at least one curved surface 222 (SEE FIG. 5), as shown. Crescent panel 220 preferably further comprises at least one radial joining flange 225 on each long edge, as shown in FIG. 3A and FIG. 3B. Radial joining flanges 225 on adjacent crescent panels 220 of spacecraft radiator skin 210 are preferably joined, preferably by adhesive bonding, alternately preferably by riveting. Upon reading this specification, those skilled in the art will now appreciate that, under appropriate circumstances, considering such issues as materials, weight restrictions, required structural integrity, etc., other methods of joining, such as, for example, bolts, screws, welding, brazing, etc., may suffice. The stability of the structure of spacecraft radiator skin 210 for taking loads is preferably augmented by such joining.

Crescent panel 220 preferably comprises thermally-conductive material, preferably metal, preferably aluminum, preferably aluminum 6061-T6. Upon reading this specification, those skilled in the art will now appreciate that, under appropriate circumstances, considering such issues as, available materials, cost, required properties, etc., other thermally conductive materials, such as, for example, other than aluminum metals, cermets, ceramics, etc., may suffice.

FIG. 3A shows a cross-sectional view, illustrating preferred crescent panel 220, according to the preferred embodiment of FIG. 1. In FIG. 3, crescent panel 220 is shown with radial joining flange 225 and spacecraft radiator skin 210 (also see FIG. 1). In addition, heat transfer tubes 410 are visible, preferably arranged running substantially perpendicular to the cross-section, as shown. Upon reading this specification, those with ordinary skill in the art will now appreciate that, under appropriate circumstances, considering such issues as design preference, user preferences, cost, structural requirements, available materials, technological advances, etc., other heat transfer tube placement arrangements arrangements such as, for example, serpentine, intersecting, diagonal, etc., may suffice.

FIG. 3B shows a geometric diagram, illustrating the preferred geometric relationships of preferred spacecraft radiator skin 210, according to the preferred embodiment of FIG. 1.

FIG. 3B Geometric Definitions:
angle gamma ($\gamma$)—angle subtending an arc formed by N divisions of a circular cross section of a major cylinder
(L)—chord of the arc subtended by angle gamma ($\gamma$)
angle theta ($\theta$)—angle subtending an arc of a circular cross section of a minor cylinder (s)—length of the arc subtended by angle theta ($\theta$)

Spacecraft radiator skin 210 preferably may be defined by geometric relationships, as shown. Curved surface 222 of crescent panel 220 preferably comprises at least one curved surface portion 370 of at least one minor cylinder with a central axis 310, as shown. At least one angle theta ($\theta$), perpendicular to and having its vertex on central axis 310, defines arc length (s). Arc length (s) preferably comprises a portion of at least one circular cross-section of such minor cylinder, as shown. Arc length (s) preferably corresponds with the width along the curve of curved surface 222. Therefore, angle theta ($\theta$) preferably characterizes the curvature of curved surface 222. This arrangement at least embodies herein wherein said at least one geometry comprises at least one panel comprising substantially at least one angular surface portion, subtended by an angle theta, of a right circular cylinder having a central longitudinal axis. Upon reading this specification, those skilled in the art will now appreciate that, under appropriate circumstances, considering such issues as, thermal efficiency requirements, available materials, cost, etc., other than circularly curved surfaces, such as, for example, ellipsoidal, parabolic, hyperbolic, etc., may suffice.

The midpoint of arc length (s) preferably comprises the intersection of at least one ray, bisecting angle theta ($\theta$), and crescent panel 220. The midpoint of arc length (s) preferably defines a centerline 320, preferably running the length of crescent panel 220, preferably parallel to central axis 310. One major cylinder, with a central axis 330, is defined with a curved surface 340 preferably containing centerline 320 (this arrangement at least embodies herein wherein said at least one panel comprises at least one centerline comprising the intersection of said at least one panel and a ray bisecting such angle theta) of each crescent panel 220 of spacecraft radiator skin 210 (this arrangement at least embodies herein wherein at least one plurality of said at least one panels adjacently adjoin such that each said at least one centerline of each said at least one panel are concentric about at least one respective common central axis of at least one respective such at least one plurality), as shown. Central axis 330 (at least embodying herein such at least one respective common central axis) preferably comprises the central axis of spacecraft radiator skin 210.

At least one angle gamma ($\gamma$), preferably perpendicular to and with its vertex on central axis 330, is preferably defined by the projection of curved surface 222 onto such major cylinder surface from central axis 330. Therefore, the value of angle gamma ($\gamma$) is preferably equal to the value of the angle, sharing a common vertex with and coplanar with angle gamma ($\gamma$), between two centerlines 320 of two adjacent crescent panels 220.

The value of angle gamma ($\gamma$) may preferably be further constrained by the equation:

$$360/\gamma = N$$

where N is preferably an integer and represents the number of crescent panels 220 needed if spacecraft radiator skin 210 completes 360 degrees. Each radial joining flange 225 is preferably oriented along at least one radial plane of such major cylinder. Each radial joining flange 225 preferably allows flush joining with another radial joining flange 225 preferably of crescent panel 220 which lies adjacent, as shown.

The radius of spacecraft radiator skin 210 is preferably defined by the value of cord (L), which is preferably defined by the intersection of the rays of angle gamma ($\gamma$) with the surface of such major cylinder. The radius of spacecraft radiator skin 210 may be calculated through the relationships inherent in an isosceles triangle with angle gamma ($\gamma$) preferably being the angle between the equal sides (or radii) and cord (L) preferably being the side opposite angle gamma ($\gamma$).

The load capacity of spacecraft radiator skin 210 correspondingly increases with increases in value of angle theta ($\theta$). However, increases in value of angle theta ($\theta$) also reduce the thermal efficiency, primarily due to view factors where thermal energy 560 (see FIG. 5), radiating and/or reflecting, is incident upon neighboring crescent panels 220. The optimum values of angle gamma ($\gamma$) and angle theta ($\theta$), as expressed in angular difference ($\theta-\gamma$), are dependent on the desired values of load capability and thermal capability of spacecraft 110. If spacecraft 110 requires less thermal capability, then a greater angular difference ($\theta-\gamma$), or difference between the values of angle gamma ($\gamma$) and angle theta ($\theta$), may be used, resulting in greater load capability. Likewise, if spacecraft 110 requires more thermal capability, then a lesser angular difference ($\theta-\gamma$) may be used, resulting in lesser load capability.

The value of angle theta ($\theta$) preferably may be varied within the restriction of: $\theta \leq 180$ degrees$+\gamma$. Values of angle gamma ($\gamma$) are restricted by the structural practicality of the construction of spacecraft radiator skin 210. Values of angle gamma ($\gamma$) are preferably between about five degrees and about 30 degrees, preferably about nine degrees.

The angular difference (θ−γ) is preferably about 40 degrees. Value of angle theta (θ) is preferably about 49 degrees and value of angle gamma (γ) is preferably about 9 degrees; this geometry of crescent panel 220 is specifically designed to minimize the inefficiency of heat dissipation, due to curvature of curved surface 222 (at least embodying herein wherein such at least one geometry of said at least one thermal energy radiator comprises at least one arcuate panel), while maximizing the load-bearing capability of spacecraft radiator skin 210 spanning 360 degrees; this geometry of crescent panel 220 preferably allows spacecraft radiator skin 210 to bear at least one portion of the overall spacecraft load, preferably resulting in an overall reduction in mass. This arrangement at least embodies herein wherein at least one geometry of said at least one thermal energy radiator substantially augments structural strength of said at least one spacecraft structural support.

Alternately preferably, the angular difference (θ−γ) equals about 120 degrees, preferably with a value of angle theta (θ) preferably equal to about 129 degrees and a value of angle gamma (γ) preferably equal to about 9 degrees; this alternate geometry of crescent panel 220 is specifically designed to maximize mass savings with less regard to thermal inefficiencies.

Upon reading this specification, those skilled in the art will now appreciate that, under appropriate circumstances, considering such issues as increased heat emitting requirements, decreased heat emitting requirements, increased mass savings requirements, material requirements, etc., variations of the difference between the value of angle theta and the value of angle gamma, such as, for example, 180 degrees, 60 degrees, 20 degrees, etc., may suffice.

Figure 4:
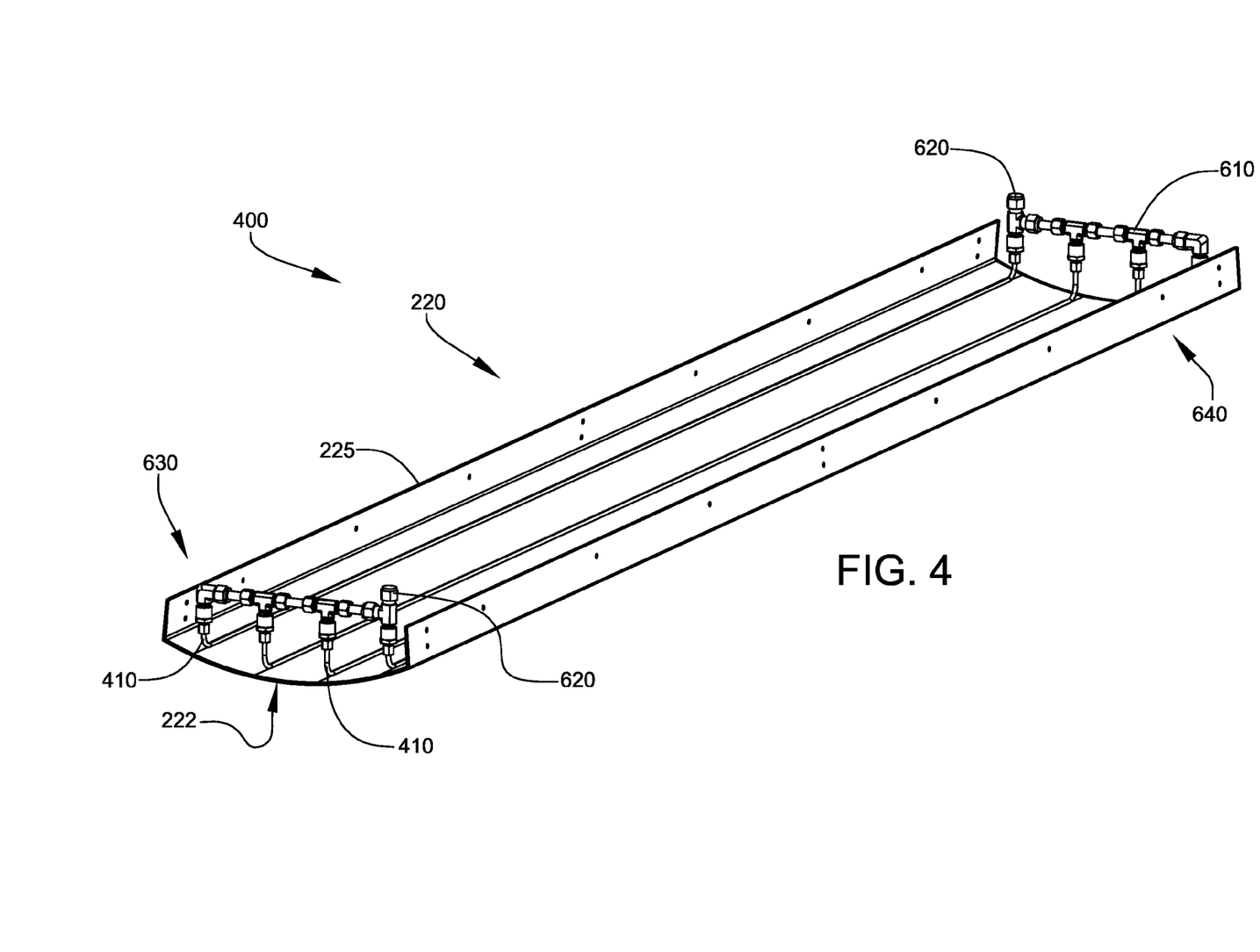
FIG. 4 shows a perspective view of at least one preferred crescent panel, illustrating a preferred heat transfer system, according to the preferred embodiment of FIG. 1.
Figure 5:
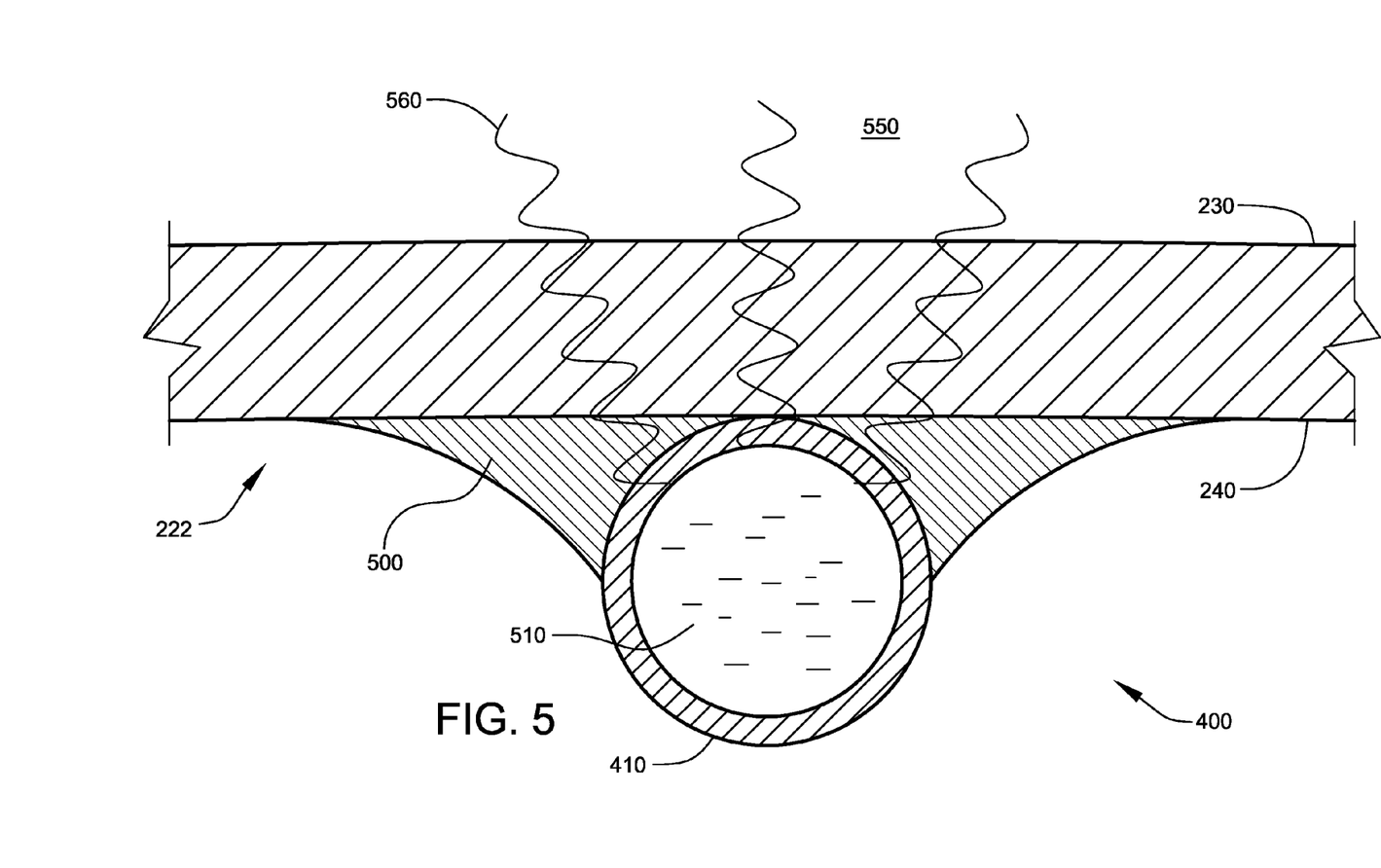
FIG. 5 shows a magnified cutaway view of Detail 5 of FIG. 3A illustrating at least one preferred heat transfer tube, illustrating transfer of thermal energy to preferred crescent panel, according to the preferred embodiment of FIG. 1.

FIG. 4 shows a perspective view of preferred crescent panel 220, illustrating a preferred heat transfer system 400, according to the preferred embodiment of FIG. 1. FIG. 5 shows a magnified cutaway view of Detail 5 of FIG. 3A illustrating at least one preferred heat transfer tube 410, illustrating transfer of thermal energy 560 to preferred crescent panel 220, according to the preferred embodiment of FIG. 1.

Heat transfer system 400 preferably comprises at least one heat transfer tube 410, as shown. Heat transfer tube 410 preferably comprises a circular cross-section. Upon reading this specification, those skilled in the art will now appreciate that, under appropriate circumstances, considering such issues as fluid flow rates, fluid types, cost, heat transfer rates, etc., other cross-section geometries, such as, for example, rectangular, ovular, square, triangular, etc., may suffice. Heat transfer tube 410 preferably comprises an outer diameter of about 3/16 of an inch and preferably an inner diameter of about 1/8 inch. Upon reading this specification, those skilled in the art will now appreciate that, under appropriate circumstances, considering such issues as, cost, thermal requirements, available materials, etc., other diameters, such as, for example, 1 mm, 1 cm, 1/4 inch, etc., may suffice. Heat transfer tube preferably comprises at least one thermally conductive material, preferably metal, preferably aluminum. Upon reading this specification, those skilled in the art will now appreciate that, under appropriate circumstances, considering such issues as materials available, cost, thermal requirements, etc., other thermally conductive materials, such as, for example, other than aluminum metals, cermets, plastics, etc., may suffice.

At least one heat transfer tube 410, preferably at least four heat transfer tubes 410, preferably attaches to crescent panel 220, as shown. Heat transfer tubes 410 are preferably attached to crescent panel 220 with at least one tube separation 490 (See FIG. 3B) of about one quarter of the arc-length (s), as shown (see FIG. 3B, marked s/4). Additionally, heat transfer tubes 410 immediately to each side of centerline 320 are preferably about 1/8th of the arc-length (s) away from centerline 320, as shown (see FIG. 3B, marked s/8).

When installed on spacecraft 110, heat transfer tube 410 (at least embodying herein wherein said at least one tube comprises at least one portion of such thermal energy transport system when said at least one thermal energy radiator is installed on such at least one spacecraft) preferably comprises at least one portion of a closed loop heat transport system. Such closed loop heat transport system preferably carries at least one heat transport fluid 510 (see FIG. 5), preferably "Galden HT-170" (commercially available from Solvay Solexis at www.solvaysolexis.com). Upon reading this specification, those skilled in the art will now appreciate that, under appropriate circumstances, considering such issues as available thermal fluids, cost, thermal properties required, etc., other heat transport fluids, such as, for example, glycols, 401A refrigerant, etc., may suffice.

During operation, heat transport fluid 510 preferably circulates through such closed loop heat transport system including heat transfer tube 410. Such closed loop heat transport system preferably comprises at least one fluid pump and a plurality fluid carrying lines which may be coupled between such at least one fluid pump and heat transfer tube 410 allowing circulation of heat transport fluid 510 (at least embodying herein wherein such thermal energy transport system comprises at least one fluid filled closed loop). While circulating, heat transport fluid 510 preferably passes by thermal energy sources within spacecraft 110 preferably to collect and preferably transport thermal energy 560, preferably to heat transfer tube 410 (this arrangement at least embodying herein wherein such at least one fluid circulates between such components of such at least one spacecraft and said at least one thermal energy radiator, when said at least one thermal energy radiator is installed on such at least one spacecraft). As heat transport fluid 510 passes through heat transfer tube 410, thermal energy 560 is preferably transferred to crescent panel 220 and preferably rejected from spacecraft 110 (see discussion of FIG. 5). This arrangement at least embodies herein wherein said at least one thermal energy radiator receives thermal energy through at least one thermal energy transport system when said at least one thermal energy radiator is installed on such at least one spacecraft.

Heat transfer tube 410 is preferably mounted to the inner surface, corresponding to inner surface 240, of crescent panel 220, as shown. Heat transfer tube 410 is preferably mounted by thermally conductive epoxy 500 (at least embodying herein wherein thermal coupling of said at least one portion of said at least one tube to said at least one thermal energy radiator comprises at least one thermally conductive epoxy), preferably aluminum based thermally conductive epoxy, preferably "Durlaco 132" (available commercially from Cotronics Corp. in Brooklyn, N.Y.). Upon reading this specification, those skilled in the art will now appreciate that, under appropriate circumstances, considering such issues as materials, available epoxies, required thermal conductivity, etc., other methods of mounting, such as, for example, welding, brazing, bonding, etc., may suffice.

Thermally conductive epoxy preferably provides at least one thermally conductive path between crescent panel 220 and heat transfer tube 410 (this arrangement at least embodying herein wherein at least one portion of said at least one tube is thermally coupled with said at least one thermal energy radiator). Such at least one thermally conductive path has a thermal conductivity of preferably greater than or equal to the thermal conductivity of the materials of crescent panel 220 and heat transfer tube 410. Thermally conductive epoxy 500 preferably comprises at least one thickness of 1/32 inch between heat transfer tube 410 and inner surface 240.

While heat transport fluid 510 circulates through heat transfer tube 410, thermal energy 560 preferably conducts from heat transport fluid 510, through wall of heat transfer tube 410 and into thermally conductive epoxy, as shown. Thermal energy 560 preferably then conducts through thermally conductive epoxy 500 into crescent panel 220, as shown. Thermal energy 560 in crescent panel 220 preferably conducts from inner surface 240 to outer surface 230, where heat is preferably emitted into at least one exterior environment 550, as shown.

Figure 6:
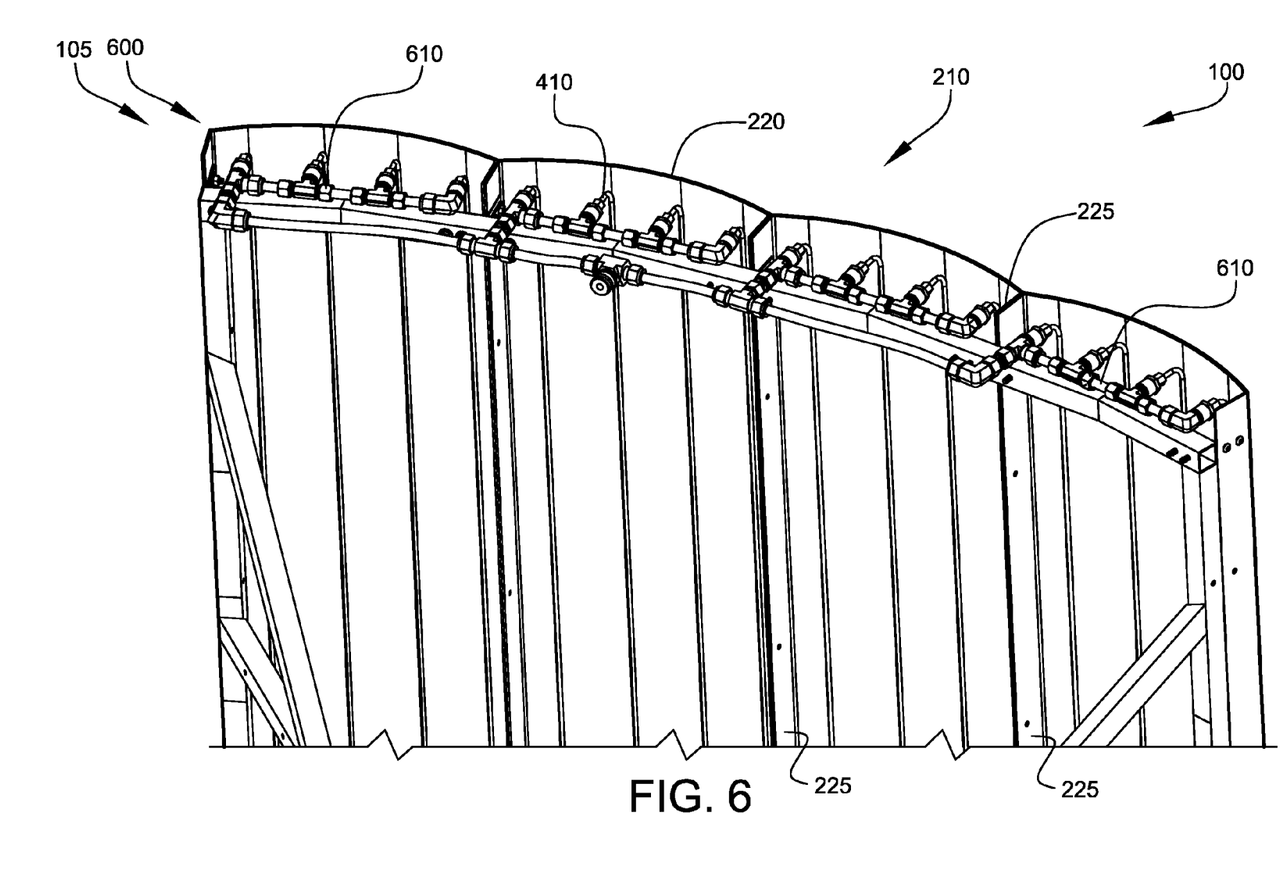
FIG. 6 shows a plurality of preferred crescent panels, illustrating at least one preferred heat transport connection system, according to the preferred embodiment of FIG. 1.

FIG. 6 shows a plurality of crescent panels 220, illustrating at least one preferred heat transport connection system 600, according to the preferred embodiment of FIG. 1. Heat transport connection system 600 preferably comprises at least one connector, preferably at least one heat transport fluid manifold 610, as shown. Upon reading this specification, those skilled in the art will appreciate that, under appropriate circumstances, considering such issues as, cost, spacecraft systems integration, weight restrictions, thermal properties of available materials, etc., other connectors, such as, for example, hose couplers, chemical bonding, metallurgical bonding, unitary construction, etc., may suffice. Heat transport fluid manifold 610 preferably comprises at least one rigid material, which reduces stress on thermally conductive epoxy 500. At least one heat transport fluid manifold 610 preferably attaches at intake side 630 of each crescent panel 220 while at least one other heat transport fluid manifold 610 preferably attaches at outlet side 640, as shown in FIG. 4 (this arrangement at least embodying herein wherein, during operation, said plurality of said at least one tube are coupled to such at least one thermal energy transport system through at least one intake manifold and at least one outlet manifold at opposing sides of said at least one thermal energy radiator). Heat transport fluid manifold 610 preferably attaches to multiple heat transfer tubes 410, as shown, preferably allowing flow of heat transport fluid 510 preferably across multiple heat transfer tubes 410 (at least embodying herein at least one tube structured and arranged to carry at least one thermal fluid) preferably attached to one crescent panel 220. Heat transfer manifold 610 preferably comprises at least one thermal transport system connector 620, as shown, used for preferably intake or preferably outlet of heat transport fluid 510, respective of whether attached to intake side 630 or outlet side 640. Thermal transport system connector 620 is preferably positioned on one end of heat transport fluid manifold 610, as shown.

When thermal energy radiator 105 is installed, heat transport fluid manifold 610 preferably couples to closed loop heat transport system preferably using thermal transport system connector 620. Heat transport fluid manifold 610 on intake side 630 of crescent panel 220 is preferably reversed in orientation from heat transport manifold on outlet side 640 of crescent panel 220, as shown; this reversal preferably allows an equalization of the fluid flow and preferably equalization of the pressure of heat transport fluid 510, preferably across heat transfer tubes 410 during operation equalizing heat distribution across crescent panel 220.

Figure 7:
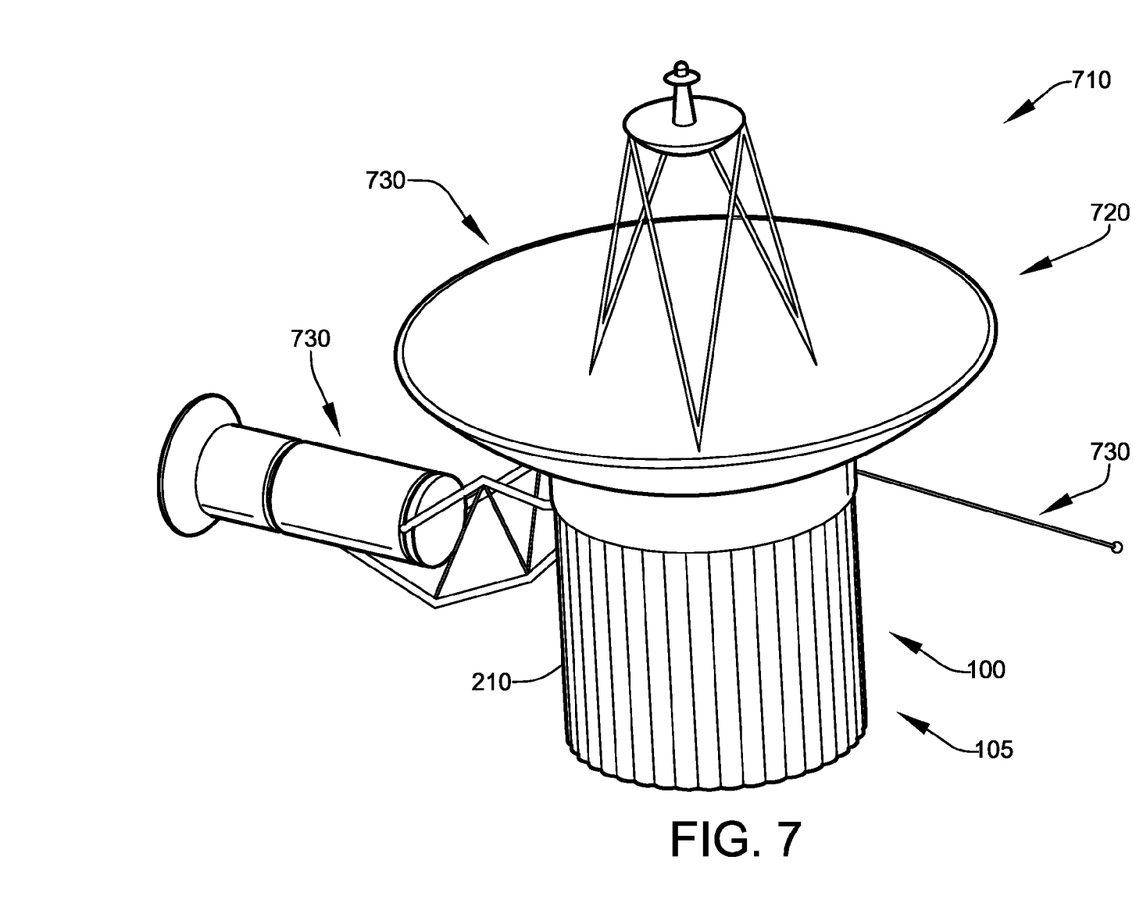
FIG. 7 shows a perspective view of an alternately preferred spacecraft, illustrating versatility of preferred spacecraft heat emitting system, according to a preferred embodiment of the present invention.

FIG. 7 shows a perspective view of an alternately preferred spacecraft 710, illustrating versatility of thermal energy radiator 105 of preferred spacecraft heat emitting system 100, according to a preferred embodiment of the present invention. Spacecraft 710 preferably comprises an unmanned spacecraft 720, as shown. Unmanned spacecraft 720 preferably comprises at least one satellite, as shown, alternately preferably at least one space probe. Unmanned spacecraft 720 preferably comprises at least one thermal energy source. Such at least one thermal energy source preferably comprises at least one nuclear power source, which preferably uses rejection of thermal energy 560 (see FIG. 5) preferably through closed loop fluid circulation. Such at least one thermal energy source alternately preferably comprises a plurality of electronic instrumentation thermal energy sources 730, which preferably accumulatively uses significant rejection of thermal energy 560 preferably through closed loop fluid circulation. Similar to spacecraft 110, thermal energy radiator 105 is incorporated into spacecraft 710, as shown. Using thermal energy radiator 105 of spacecraft heat emitting system 100 preferably reduces overall mass of spacecraft 710, preferably due to load bearing structural integration, as discussed in FIGS. 1-6. Additionally, thermal energy radiator 105 of heat emitting system 100 preferably also minimizes heat emitting inefficiencies, similarly as discussed in FIGS. 1-6.

Figure 8:
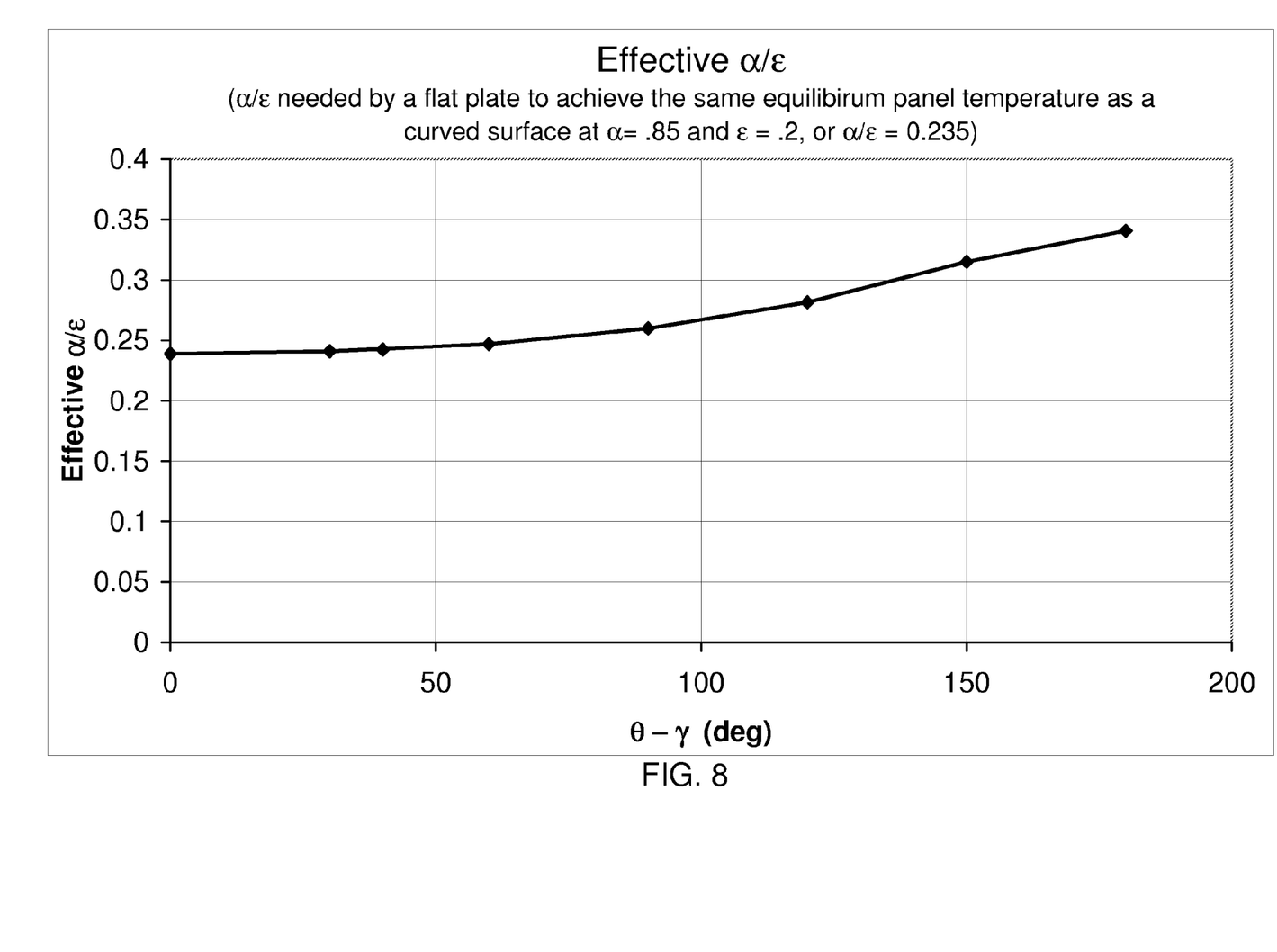
FIG. 8 shows a graph, illustrating the variation of inefficiencies of spacecraft heat emitting system due to geometry variations, according to the preferred embodiment of FIG. 6.

FIG. 8 shows a graph, illustrating the variation of inefficiencies of spacecraft heat emitting system 100 due to geometry variations, according to the preferred embodiment of FIG. 6. In thermal energy radiator 105, applicant determined that with increase in the angular difference ($\theta-\gamma$), the increases in the absorbtivity ($\alpha$) outweighed the increases in emissivity ($\epsilon$). As shown, the ratio between absorbtivity and emissivity needed by a flat plate to achieve the same equilibrium panel temperature as curved surface portion 370 (see FIG. 3B), with absorbtivity ($\alpha$) of about 0.85 and emissivity ($\epsilon$) of about 0.2, increases with increases in angular difference ($\theta-\gamma$). Applicant theorizes that inefficiencies indicated by this increase is due to view factors, where some thermal energy 560 being reflected from one portion of spacecraft radiator skin 210 may impinge upon another portion of spacecraft radiator skin 210, thereby increase opportunities for thermal energy 560 to be absorbed. Applicant determined, however, that such inefficiencies do not have significant impact until angular difference ($\theta-\gamma$) exceeds about 60 degrees, as shown.

Figure 9:
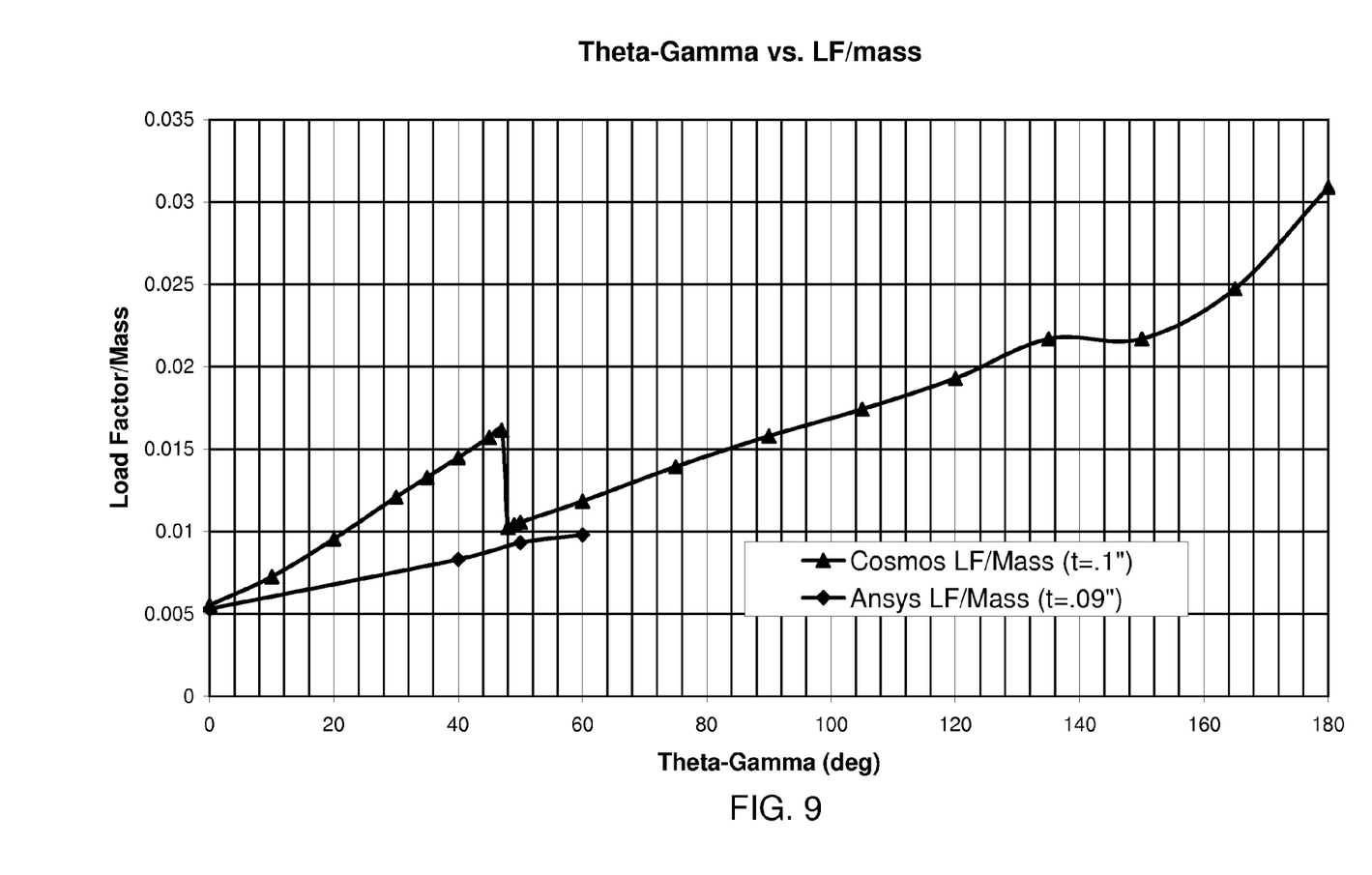
FIG. 9 shows a graph, illustrating the variation of the load factor of spacecraft radiator skin due to geometry variations, according to the preferred embodiment of FIG. 1.

FIG. 9 shows a graph, illustrating the variation of the load factor of spacecraft radiator skin 210 due to geometry variations, according to the preferred embodiment of FIG. 1. Applicant has determined, through modeling and experimentation, that increases in load factor of spacecraft radiator skin 210 follow from increases in angular difference ($\theta-\gamma$). An initial set of modeled data of load factor (indicated by triangular data markers) shows a step-down between a difference of 48 degrees and a difference of 49 degrees. Applicant has determined, using another modeling software, that such step-down is an anomaly as indicated by a second set of modeled data (indicated by diamond data markers). Such second set of modeled data aligns closer to the lower values from such initial set of modeled data while maintaining a shape consistent with the higher values.

Figure 10:
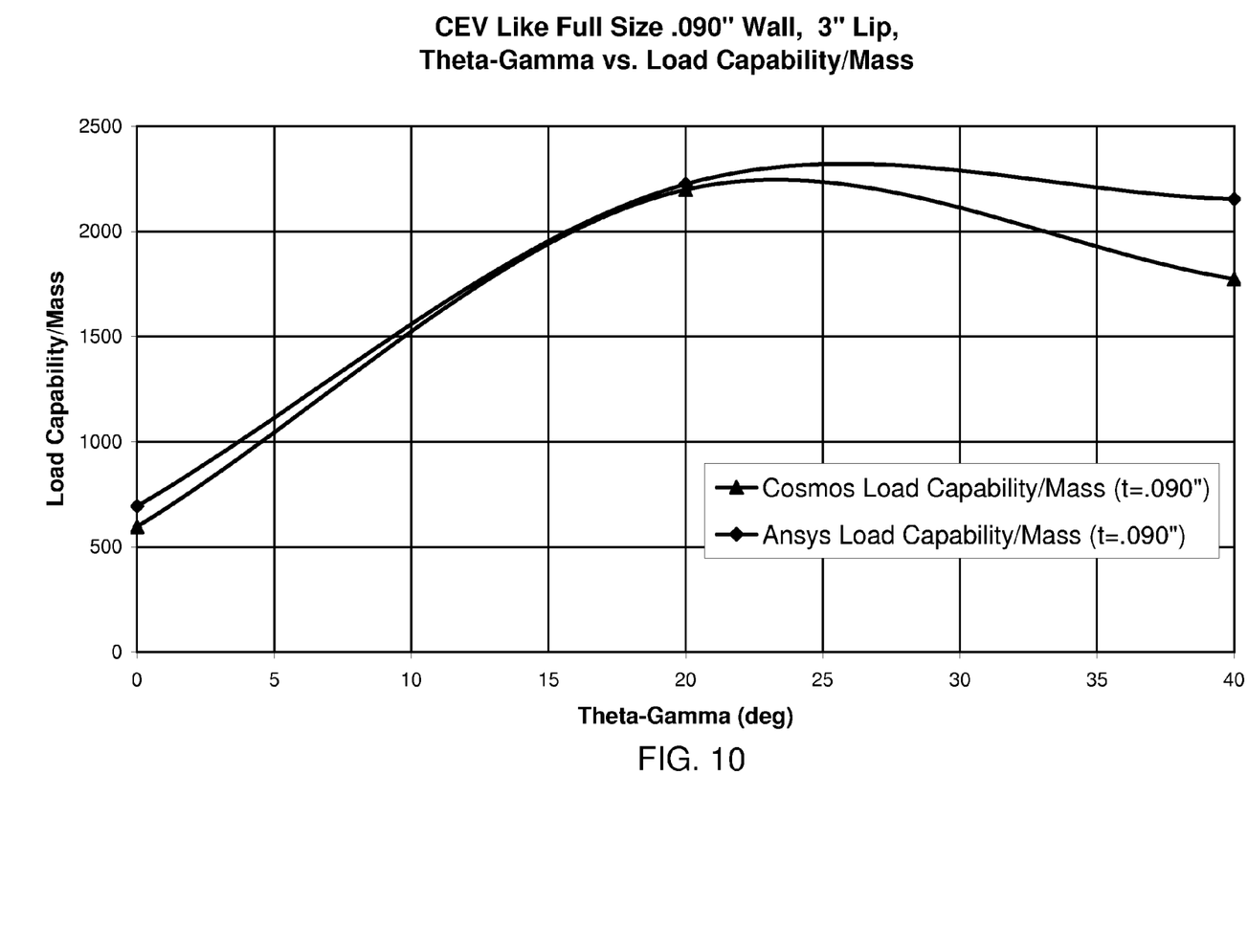
FIG. 10 shows a graph, illustrating the variation of the load support capability of preferred spacecraft radiator skin due to geometry variations [angular difference $(\theta-\gamma)$], according to the preferred embodiment of FIG. 1.

FIG. 10 shows a graph, illustrating the variation of the load support capability of spacecraft radiator skin 210 due to geometry variations [angular difference ($\theta-\gamma$)], according to the preferred embodiment of FIG. 1. With emphasis on the more thermally efficient values of angular difference ($\theta-\gamma$) of less than about 40 degrees, data derived from both such initial set of modeled data and such second set of modeled data are plotted. As shown, load capacity increases with increases in angular difference ($\theta-\gamma$). Applicant has determined that the modeling data is consistent with empirical buckling testing, performed by applicant, within accepted load capacity variances due to uncontrollable manufacturing inconsistencies which typically range between about 40% and about 60% of theoretical values.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A radiator system, relating to a generally-cylindrical spacecraft having a longitudinal axis, comprising:
   a) at least one thermal energy radiator structured and arranged to radiate thermal energy generated by components of at least one spacecraft;
   b) wherein said at least one thermal energy radiator receives thermal energy through at least one thermal energy transport system when said at least one thermal energy radiator is installed on such at least one spacecraft; and
   c) at least one spacecraft structural support structured and arranged to structurally support such at least one spacecraft;
   d) wherein said at least one thermal energy radiator comprises at least one portion of said at least one spacecraft structural support; and
   e) wherein at least one geometry of said at least one thermal energy radiator substantially augments structural strength of said at least one spacecraft structural support;
   f) wherein said at least one geometry of said at least one thermal energy radiator comprises at least one surface comprising at least one cylindrical surface portion having a first central longitudinal axis; and
   g) wherein said first central longitudinal axis is coplanar with a second central longitudinal axis of at least one generally-cylindrical portion of such at least one spacecraft.

2. The radiator system according to claim 1 wherein such thermal energy transport system comprises at least one fluid filled closed loop.

3. The radiator system according to claim 2 wherein said at least one thermal energy radiator further comprises:
   a) at least one tube structured and arranged to carry at least one thermal fluid;
   b) wherein said at least one tube comprises at least one portion of such thermal energy transport system when said at least one thermal energy radiator is installed on such at least one spacecraft;
   c) wherein such at least one thermal fluid circulates between such components of such at least one spacecraft and said at least one thermal energy radiator, when said at least one thermal energy radiator is installed on such at least one spacecraft; and
   d) wherein at least one portion of said at least one tube is thermally coupled with said at least one thermal energy radiator.

4. The radiator system according to claim 3 wherein said at least one tube comprises aluminum.

5. The radiator system according to claim 3 wherein said at least one tube comprises at least one outer diameter of about 3/16 inch.

6. The radiator system according to claim 5 wherein said at least one tube comprises at least one inner diameter of about 1/8 inch.

7. The radiator system according to claim 3 wherein thermal coupling of said at least one portion of said at least one tube to said at least one thermal energy radiator comprises at least one thermally conductive epoxy.

8. The radiator system according to claim 7 wherein said at least one thermally conductive epoxy comprises aluminum.

9. The radiator system according to claim 3 wherein at least one thermal energy radiator comprises a plurality of said at least one tube.

10. The radiator system according to claim 9 wherein, during operation, said plurality of said at least one tube are coupled to such at least one thermal energy transport system through at least one intake manifold and at least one outlet manifold situate on said at least one thermal energy radiator.

11. The radiator system according to claim 1 wherein said at least one thermal energy radiator comprises aluminum.

12. The radiator system according to claim 11 wherein said at least one thermal energy radiator comprises aluminum 6061-T6.

13. The radiator system according to claim 1 wherein said at least one thermal energy radiator comprises at least one diameter of about 13 feet.

14. The radiator system according to claim 1 wherein said at least one thermal energy radiator comprises a radiating-skin thickness of about nine hundredths of an inch.

15. A radiator system, relating to a generally-cylindrical spacecraft having a longitudinal axis, comprising:
   a) at least one thermal energy radiator structured and arranged to radiate thermal energy generated by components of such spacecraft;
   b) wherein said at least one thermal energy radiator receives thermal energy through at least one thermal energy transport system when said at least one thermal energy radiator is installed on such spacecraft; and
   c) at least one spacecraft structural support structured and arranged to structurally support such spacecraft;
   d) wherein said at least one thermal energy radiator comprises at least one portion of said at least one spacecraft structural support; and
   e) wherein at least one geometry of said at least one thermal energy radiator substantially augments structural strength of said at least one spacecraft structural support;
   f) wherein said at least one geometry comprises at least one panel comprising substantially at least one angular surface portion, subtended by an angle theta, of a right circular cylinder having a central longitudinal axis;
   g) wherein said at least one panel comprises at least one centerline comprising the intersection of said at least one panel and a ray bisecting such angle theta;
   h) wherein at least one plurality of said at least one panels adjacently adjoin such that each said at least one centerline of each said at least one panel are concentric about at least one respective common central axis of at least one respective such at least one plurality;
   i) wherein each said at least one panel in said at least one plurality comprises at least one regular angular displacement comprising at least one angle gamma measured from such at least one respective common central axis; and
   j) wherein the difference between the value of said at least one angle theta and said at least one angle gamma is less than 180 degrees.

16. The radiator system according to claim 15 wherein the difference between the value of such at least one angle theta and such at least one angle gamma is about 40 degrees.

17. The radiator system according to claim 16 wherein such at least one angle gamma is about nine degrees.

18. The radiator system according to claim 15 wherein the difference between the value of such at least one angle theta and such at least one angle gamma is about 120 degrees.

19. The radiator system according to claim 18 wherein such at least one angle gamma is about nine degrees.

20. The radiator system according to claim 15 wherein said at least one thermal energy radiator comprises aluminum.

21. The radiator system according to claim 20 wherein said at least one thermal energy radiator comprises aluminum 6061-T6.

22. The radiator system according to claim 15 wherein such at least one thermal energy transport comprises at least one fluid filled closed loop.

23. The radiator system according to claim 22 wherein said at least one thermal energy radiator further comprises:
   a) at least one tube structured and arranged to carry at least one thermal fluid;
   b) wherein said at least one tube comprises at least one portion of such thermal energy transport system when said at least one thermal energy radiator is installed on such spacecraft
   c) wherein such at least one thermal fluid circulates between such components of such at least one spacecraft and said at least one thermal energy radiator, when said at least one thermal energy radiator is installed on such spacecraft; and
   d) wherein at least one portion of said at least one tube is thermally coupled with said at least one thermal energy radiator.

24. The radiator system according to claim 23 wherein said at least one tube comprises aluminum.

25. The radiator system according to claim 23 wherein said at least one tube comprises at least one outer diameter of about 3/16 inch.

26. The radiator system according to claim 25 wherein said at least one tube comprises at least one inner diameter of about 1/8 inch.

27. The radiator system according to claim 23 wherein thermal coupling of said at least one portion of said at least one tube to said at least one thermal energy radiator comprises at least one thermally conductive epoxy.

28. The radiator system according to claim 27 wherein said at least one thermally conductive epoxy comprises aluminum.

29. The radiator system according to claim 23 wherein at least one thermal energy radiator comprises a plurality of said at least one tube.

30. The radiator system according to claim 29 wherein, during operation, said plurality of said at least one tube are coupled to such at least one thermal energy transport system through at least one intake manifold and at least one outlet manifold situate on said at least one thermal energy radiator.

31. The radiator system according to claim 23 wherein said at least one thermal energy radiator comprises aluminum.

32. The radiator system according to claim 31 wherein said at least one thermal energy radiator comprises aluminum 6061-T6.

33. The radiator system according to claim 23 wherein said at least one thermal energy radiator comprises at least one diameter of about 13 feet.

34. The radiator system according to claim 23 wherein said at least one thermal energy radiator comprises a radiating-skin thickness of about nine hundredths of an inch.

\* \* \* \* \*